United States Patent Office 2,868,663
Patented Jan. 13, 1959

2,868,663

PIGMENTED SYNTHETIC MATERIAL AND A METHOD FOR MAKING THE SAME

Joseph M. Jarmus, East Orange, and Daniel Kaufman, Fords, N. J., and Francis R. Marchetti, New York, N. Y., assignors to National Lead Company, New York, N. Y., a corporation of New Jersey No Drawing. Application August 29, 1956
Serial No. 606,799

11 Claims. (Cl. 106—193)

This invention relates in general to synthetic materials and more particularly to synthetic polymeric products prepared from macromolecular polymers, the invention being specifically concerned with improved pigmented synthetic polymeric films and to a method for the production of such films.

The preparation of synthetic polymeric products from macromolecular polymers is well known and widely practiced in the plastics industry; and this art is pertinent to the instant invention insofar as the macromolecular polymers used in the industry are those which have been successfully pigmented by the process of the instant invention. Macromolecular polymers which have been used commonly for producing synthetic products and in particular relatively thin sheets or membranes include cellulose acetate, cellulose acetate butyrate, cellulose acetate propionate, nitrocellulose, ethyl cellulose; vinyls including vinyl acetate, vinyl chloride acetate, vinyl butyrate and vinylidene chloride; acrylates including acrylonitrile, methyl acrylate and methyl methacrylate; silicones; and epoxy resins and the like. Macromolecular polymers especially suitable for forming slender threadlike members such as filaments and fibers include cellulose acetate and rayon; acrylonitrile and its copolymers such as dynel, acrilan and the like; and vinyls such as vinyl chloride acetate and the like.

While the major contribution of the instant invention may be said to be the solution of problems peculiar to the production of "synthetic film" which term as used herein will be understood to include relatively thin sheets or membranes as well as slender threadlike members such as filaments and fibers its scope being comprehensive of any pigmented synthetic polymeric product.

Many attempts have been made to produce colored synthetic films by pigmenting the same with the various organic and inorganic coloring agents. However, it has been found that the coloring agents usually employed produce films having inconsistent and/or non-uniform colors which are difficult to match from batch to batch. Moreover, some of these colored films possess brownish or off-colored tones which are undesirable.

Because of its high hiding power, one particularly desirable coloring agent for use in such films is titanium dioxide of pigmentary grade and particularly pigmentary titanium dioxide of the rutile modification. However, previous efforts to use pigmentary grade $TiO_2$ have not produced satisfactory results. In the preparation of synthetic films the macromolecular polymer is admixed with an organic solvent but apparently commercial grades of pigmentary $TiO_2$ are immiscible in certain types of organic solvents, as a consequence of which a high degree of flocculation of the pigment takes place in these solvent-polymer mixes, thereby producing inconsistent non-uniformly colored films. It is necessary, therefore, to produce a pigmentary grade of $TiO_2$ pigment, preferably of the rutile modification, which will disperse readily in the organic solvents used in the preparation of synthetic films of the class described above.

An object, therefore, of the instant invention is to produce titanium dioxide pigmented synthetic polymeric products of uniform color.

Another object is to produce titanium dioxide pigmented fibers and filaments of uniform color from macromolecular polymers.

Another object is to prepare titanium dioxide pigmented synthetic film in which the pigment is uniformly dispersed throughout the synthetic film.

Still another object is to prepare titanium dioxide pigments which are readily dispersible in organic solvents of the class used in the preparation of synthetic products from macromolecular polymers. These and other objects will become apparent from the following more complete description of the instant invention.

In its broadest aspects, this invention contemplates an internally pigmented synthetic product comprising the residuum of an admixture of an organic solvent, pigmentary $TiO_2$ and a macromolecular polymer wherein the pigmentary $TiO_2$ is processed in accordance with the instant invention so as to be readily dispersible in the solvent and hence distributed substantially uniformly throughout the subsequently formed product. In this respect the pigment $TiO_2$ is not a surface coating on the product but is distributed throughout and hence the product may be and is properly defined hereinafter as being internally pigmented.

More particularly, the instant invention contemplates an internally pigmented synthetic film comprising the residuum of an admixture of a macromolecular polymer, an organic solvent, a metal oxide coated $TiO_2$ pigment and from 0.2% to 5.0% and preferably from 0.25% to 2.0% by weight of said pigment of an organic compound having the structure

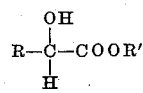

where R is selected from the group consisting of alkyl and aryl radicals and where R' is selected from the group consisting of hydrogen, ammonium, alkali metal, alkyl and aryl radicals, the said metal oxide coating of said treated titanium dioxide pigment comprising a hydrous oxide of a metal selected from the group consisting of aluminum, titanium, silicon and zirconium and mixtures thereof coated on the surface of said pigment in amount from 0.25% to 10.0% and preferably from 0.5% to 4.0% based on the weight of said pigment. As mentioned at the outset, the term "film," as used herein, is not restricted to sheet-like material but is comprehensive of fibers and filaments formed as the reaction product of the constituents hereinabove named.

This invention further contemplates a method for the preparation of the above described internally pigmented product, e. g. synthetic film, and for purposes of illustration one method comprises admixing a macromolecular polymer and an hydrous metal oxide coated titanium dioxide pigment with an organic compound having the structure described above, dispersing said admixture in an organic solvent such as for example acetone, ethylene glycol n-butyl ether, diethylene glycol n-butyl ether, methyl ethyl ketone, acetonitrile, dimethyl formamide, and the like and then evaporating said solvent from said admixture to form a residue or end product comprising an internally pigmented synthetic film. In carrying out the process, the amounts of constituents used are sufficient to insure a residue or end product having the composition set out above.

This invention also contemplates preparing a titanium dioxide pigment which will be dispersible in organic solvents such as those identified above and hence adaptable for use in internally pigmenting polymeric products, said pigment comprising a titanium dioxide pigment, preferably of the rutile modification, having a hydrous oxide of a metal selected from the group consisting of aluminum, titanium, silicon, zirconium and mixtures thereof, coated on the surface of said pigment in amount from 0.25% to 10.0% by weight of said pigment, and an organic compound having the structure

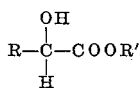

where R is selected from the group consisting of alkyl and aryl radicals and where R' is selected from the group consisting of hydrogen, ammonium, alkali metal, alkyl and aryl radicals, dispersed on the surface of the metal oxide coated titanium dioxide pigment in amount from 0.2% to 5.0% and preferably from 0.25% to 2.0% by weight of said pigment.

The metal oxide coated titanium dioxide pigment is prepared by any one of several well-known methods. For example, after calcination of a titanium dioxide hydrate, the calcined product is subjected to a ball milling operation to reduce the agglomeration of the calcined materials. In this ball milling operation any well known dispersing agents, such as an alkali metal phosphate, silicate and other dispersants well known to the art, are employed. The ball milled discharge is then introduced into a tank where salts of aluminum, titanium, silicon, zirconium and mixtures thereof are added as coating agents. If desirable a flocculation agent such as $MgSO_4$ may be added to the tank prior to the addition of the metal salts. Following the precipitation of the hydrous oxide coating on the pigment the coated titanium dioxide pigment is washed to remove any soluble salts.

According to the instant invention, the hydrous metal oxide coated pigment is treated with from 0.2% to 5.0% and preferably from 0.25% to 2.0% of an organic compound having the structure

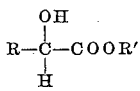

where R is selected from the group consisting of alkyl and aryl radicals and where R' is selected from the group consisting of hydrogen, ammonium, alkali metal, alkyl and aryl radicals. This treatment may be accomplished by adding the compound directly to the hydrous metal oxide coated pigment either in a wet state directly following washing of the coated pigment; or a dry state. In any event, it is desirable that the treatment take place in a manner such that a thorough mixing of the metal oxide coated pigment and the organic compound is obtained and to this end the organic compound may be dissolved in acetone, ethylene glycol n-butyl ether, diethylene glycol n-butyl ether, methyl ethyl ketone, acetonitrile, dimethylformamide, or the like to form a treating solution which is applied by spraying or similar techniques to the metal oxide coated pigment.

The organic compounds which fall within the group contemplated by the instant invention are alpha hydroxy acids and their derivatives including esters and alkali metal salts, and among the most readily available and the most economical are the following:

Lacttic acid: $CH_3CHOHCOOH$
Mandelic acid: $C_6H_5CHOHCOOH$
Benzilic acid: $(C_6H_5)_2COHCOOH$
Alpha hydroxyisobutyric acid: $(CH_3)_2COHCOOH$
Ethyl lactate: $CH_3CHOHCOOC_2H_5$
n-Butyl lactate: $CH_3CHOHCOO(CH_2)_3CH_3$
2-ethoxy ethyl lactate: $CH_3CHOHCOOCH_2CH_2OC_2H_5$ Additional alpha hydroxy acid derivatives having good dispersion properties include the following compounds:

Beta phenyl lactic acid: $CH_2(C_6H_5)CHOHCOOH$
Alpha phenyl lactic acid: $CH_3C(OH)(C_6H_5)COOH$
Phenyl ethyl lactate: $CH_3CHOHCOOC_2H_4C_6H_5$
Ethyl mandelate: $C_6H_5CHOHCOOC_2H_5$
Methyl mandelate: $C_6H_5CHOHCOOCH_3$ and the alkali metal lactates including ammonium such as:

Sodium lactate: $CH_3CHOHCOONa$
Potassium lactate: $CH_3CHOHCOOK$
Lithium lactate: $CH_3CHOHCOOLi$
Calcium lactate: $(CH_3CHOHCOO)_2Ca$
Ammonium lactate: $CH_3CHOHCOONH_4$ Metal oxide coated titanium dioxide pigments so treated are readily dispersible in acetone, and the other organic solvents identified above which are used to prepare synthetic films from macromolecular polymers.

To prepare an internally pigmented synthetic film from a macromolecular polymer, the treated titanium dioxide pigment described above is mixed thoroughly with an organic solvent, such as, for example, acetone, and an acetone-soluble macromolecular polymer, and thereafter an internally pigmented film is produced from the mixture by removing the acetone therefrom. Due to the ready dispersion in acetone of the treated metal oxide coated $TiO_2$ pigment, the latter is uniformly dispersed throughout the admixture from which the film is formed, as a consequence of which the synthetic film is internally pigmented substantially uniformly throughout with the $TiO_2$ pigment.

In order to more fully describe and illustrate the product obtained by the instant invention, the following examples are presented.

EXAMPLE I

An hydrous metal oxide coated pigment was prepared in the manner hereinabove described wherein the metal salts of titanium, silicon and aluminum were admixed with titanium dioxide to produce a titanium dioxide pigment of the rutile modification coated with the oxides of titanium, aluminum and silicon in the amount of about 3.55% by weight of said pigment. 100 parts by weight of this dried hydrous metal oxide coated pigment was treated with a treating solution comprising lactic acid dissolved in acetone to give a concentration of 100 parts/liter. The addition of this treating solution to 100 parts of the dried metal oxide coated pigment provided a pigment incorporating 1.0% lactic acid by weight of said pigment; and was done by spraying the solution on the pigment in a ribbon mixer and mixing for an hour followed by jet milling after which the pigment was bagged.

The treated pigment was tested for dispersion in acetone by weighing 5 grams of the pigment into a 100 ml. glass stoppered cylinder and adding acetone to the 100 ml. mark. The mixture was shaken by hand for 1 minute and allowed to stand for two hours after which the top 20 ml. was transferred by means of a pipette to a watch glass, dried and weighed. The weight of the dried treated pigment was 0.84 gram.

The percent dispersion in acetone of the pigment was calculated as follows:
.84 gram pigment (in top 20 ml.) × 100 = 84% $TiO_2$ in suspension.

0.21 part by weight of the treated pigment was added to 10 ml. of a 15% solution of cellulose acetate and acetone and the mixture thoroughly stirred after which a 0.005 inch drawdown was made on glass and the solvent evaporated leaving a residuum comprising an internally pigmented synthetic film of uniform color the reflectance value of which was 68.1% at 550 millimicrons as measured by a Hunter reflectometer.

A second run was made in which 0.21 part of the lactic acid treated pigment was added to 10 ml. of a 15% solution of vinyl chloride and acetone. The draw down on glass had a reflectance value of 45.0% at 550 millimicrons.

Similar dispersion experiments were done with the same hydrous oxide coated pigments using varying quantities of lactic acid and for comparative purpose the dispersion ratings of these treated hydrous oxide coated pigments in acetone are listed below:

*Table I*

[Variations in quantity of lactic acid as dispersant for hydrous oxide coated rutile $TiO_2$ pigment in acetone.]

| Treatment: | Acetone dispersion, percent $TiO_2$ in suspension |
|---|---|
| 0.20% lactic acid | 0.0 |
| 0.25% lactic acid | 73 |
| 0.50% lactic acid | 80 |
| 1.0% lactic acid | 84 |
| 2.0% lactic acid | 75 |
| 3.0% lactic acid | 64 |
| 5.0% lactic acid | 52 |

The preferred operating range will be seen to lie between 0.25 and 2.0% lactic acid.

A series of 16 additional experiments were run similar in all respects to Example I except that other alpha hydroxy acids and their derivatives were used. The dispersion ratings of the treated hydrous oxide coated pigments in acetone is listed below:

*Table II*

| Ex. | Treatment | Dispersion in Acetone |
|---|---|---|
| II | 1% mandelic acid | 79.0 |
| III | 1% beta phenyl lactic acid | 84.2 |
| IV | 1% alpha phenyl lactic acid | 82.0 |
| V | 1% benzilic acid | 79.4 |
| VI | 1% alpha hydroxyisobutyric acid | 84.4 |
| VII | 1% ethyl lactate | 76.0 |
| VIII | 1% n-butyl lactate | 70.3 |
| IX | 1% phenyl ethyl lactate | 61.8 |
| X | 1% 2-ethoxy ethyl lactate | 77.1 |
| XI | 1% ethyl mandelate | 77.3 |
| XII | 1% methyl mandelate | 81.0 |
| XIII | 0.5% sodium lactate | 70.7 |
| XIV | 0.5% potassium lactate | 54.5 |
| XV | 0.5% lithium lactate | 67.9 |
| XVI | 0.5% ammonium lactate | 46.0 |
| XVII | 1% calcium lactate | 32.4 |

As with the lactic acid treatment the preferred range of treatment of the hydrous oxide coated pigment using the alpha hydroxy acids and their derivatives, listed in Table II, was found to be from 0.25 to 2.0% with the exception however of the alkali metal lactates which exhibit optimum dispersion ratings in acetone using from about 0.5% to 1% lactate.

In all of the above examples the pigment used was a rutile $TiO_2$ pigment having a hydrous oxide coating of titanium, silicon and alumina. A second set of experiments was run using the lactic acid treatment disclosed in Table I except that in the second series of experiments three different types of pigment were used the one a $TiO_2$ pigment of the anatase modification coated with 1% hydrous aluminum oxide by weight of the pigment; the second a $TiO_2$ pigment of the rutile modification similarly coated with 1% hydrous aluminum oxide; and the third a rutile $TiO_2$ pigment having no hydrous oxide coating.

Listed in the table below are the dispersion ratings in acetone of these pigments treated with various percentages of lactic acid

*Table III*

[Percent dispersion $TiO_2$ in acetone.]

| Percent Lactic Acid | $TiO_2$ anatase ($Al_2O_3$) | $TiO_2$ rutile ($Al_2O_3$) | $TiO_2$ rutile (no coating) |
|---|---|---|---|
| 0.20 | 0.0 | 1.1 | 0.0 |
| 0.25 | 1.0 | 84.7 | 0.0 |
| 0.50 | 50.0 | 80.0 | 0.0 |
| 1.0 | 44.0 | 70.5 | 0.0 |
| 2.0 | 12.0 | 51.3 | 0.0 |
| 3.0 | 9.0 | 41.1 | 0.0 |
| 5.0 | 4.0 | 18.9 | 0.0 |

Table III shows conclusively that a lactic acid treated $TiO_2$ pigment having no hydrous oxide coating is not dispersible in acetone. Moreover that a lactic acid treated anatase $TiO_2$ pigment having an aluminum oxide coating has considerably lower dispersion ratings in acetone as compared to those of a lactic acid treated rutile pigment having an aluminum oxide coating. The dispersion ratings of the latter pigments are comparable to the rutile pigment coated with the oxides of aluminum, silicon and titanium, see Table I supra.

These pigments were also treated with the various alpha hydroxy acids set out in Table II and were found to have dispersion ratings in acetone comparable to similar pigments treated with lactic acid.

In general pigmented synthetic films, either in the form of thin sheets or fine threads, are produced by extruding a "dope" solution comprising an admixture of a macromolecular polymer or resin, an organic solvent such as acetone, a stabilizer and a coloring agent, through suitable extruding dies or spinnerets after which the solvent is removed from the extruded product.

The preferred organic solvent for the production of most types of commercial films is acetone and hence it was this practical consideration in mind that led to the discovery of the alpha hydroxy acids hereinabove described as suitable treating agents for effecting a high dispersion of hydrous oxide coated pigment in dopes. It will be understood however that the alpha hydroxy acid treated pigments of this invention are dispersible in other organic solvents as for example ethylene glycol n-butyl ether, diethylene glycol n-butyl ether, methyl ethyl ketone, acetonitrile, dimethyl formamide and the like. However as might be expected the degree of dispersion of the treated pigments in these solvents varies and for comparative purposes are listed in the following table:

*Table IV*

| Solvent | Percent Dispersion of hydrous oxide coated $TiO_2$ treated with— | |
|---|---|---|
|  | 1% lactic acid | 1% mandelic acid |
| dimethyl formamide | 90.9 | 0.0 |
| ethylene glycol n-butyl ether | 91.0 | 24.0 |
| diethylene glycol n-butyl ether | 96.0 | 88.0 |
| ethyl acetate | 0.6 | 55.2 |
| butyl acetate | 3.7 | 71.7 |
| methyl isobutyl ketone | 41.4 | 83.0 |
| methyl ethyl ketone | 84.4 | 82.2 |

Although the treated pigments hereinabove described are adaptable especially for use as coloring agents in polymers prepared in the presence of an organic solvent it has been discovered that pigmentary $TiO_2$ treated with alpha hydroxy acids and in particular lactic acid has equally high dispersion ratings (as compared to untreated $TiO_2$) when used as a coloring agent in the preparation of plastisols and organosols.

For example by admixing lactic acid treated $TiO_2$ pigment with a vinyl power and a plasticizer to form a plastisol of paste-like consistency and then heating the plastisol sufficiently to form a vinyl resin film the treated pigment will be found to be substantially uniformly dispersed throughout the film. In like manner resins prepared from organosols are characterized by a uniform dispersion of treated pigment throughout the finished product. The ease and simplicity with which the treated $TiO_2$ pigment can be admixed with the organosol or plastisol and the uniform dispersion of the treated pigment in the finished resin constitute a marked improvement over prior methods.

From the above description and by the examples shown, it is apparent that the treated titanium dioxide pigment produced by the instant invention is highly dispersible in acetone and similar organic solvents, and therefore, is compatible with organic solvent soluble macromolecular film forming polymers; and that the films, filaments and fibers produced from such mixtures are therefore uniformly pigmented with the treated titanium dioxide.

While this invention has been described and illustrated by the examples shown, it is not intended to be strictly limited thereto, and other modifications and variations may be employed within the scope of the following claims.

We claim:

1. An internally pigmented polymeric product comprising a macromolecular polymer and dispersed throughout said polymer a hydrous oxide treated titanium dioxide pigment and from 0.2% to 5.0% by weight of said pigment, of an organic compound of an alpha hydroxy acid having the structure

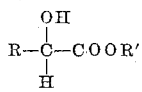

where R is selected from the group consisting of alkyl and aryl radicals and where R' is selected from the group consisting of hydrogen, ammonium, alkali metals, alkyl and aryl radicals, said treated titanium dioxide pigment having a hydrous oxide of a metal selected from the group consisting of aluminum, titanium, silicon, zirconium and mixtures thereof coated on the surface of said pigment in amount from 0.25% to 10.00% based on the weight of said pigment.

2. An internally pigmented synthetic film comprising a macromolecular polymer, and dispersed throughout said polymer a hydrous oxide treated titanium dioxide pigment and from 0.2% to 5.0% by weight of said pigment, of an organic compound of an alpha hydroxy acid having the structure

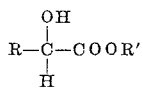

where R is selected from the group consisting of alkyl and aryl radicals and where R' is selected from the group consisting of hydrogen, ammonium, alkali metals, alkyl and aryl radicals, said treated titanium dioxide pigment having a hydrous oxide of a metal selected from the group consisting of aluminum, titanium, silicon and zirconium and mixtures thereof coated on the surface of said pigment in amount from 0.25% to 10.00% based the weight of said pigment.

3. A method for the preparation of an organic solvent dispersible pigment which comprises admixing a hydrous oxide treated titanium dioxide pigment, and an organic compound of an alpha hydroxy acid having the structure

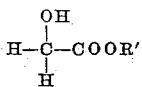

where R is selected from the group consisting of alkyl and aryl radicals and where R' is selected from the group consisting of hydrogen, ammonium, alkali metals, alkyl and aryl radicals, said organic compound being present in said dispersion in amount from 0.2% to 5.0% by weight of said pigment, said treated titanium dioxide pigment having a hydrous oxide of a metal selected from the group consisting of aluminum, titanium, silicon and zirconium and mixtures thereof coated on the surface of said pigment in amount from 0.25% to 10.00% based on the weight of said pigment.

4. A titanium dioxide pigment adaptable for use in internally pigmenting a polymeric product comprising: titanium dioxide pigment, a hydrous oxide of a metal selected from the group consisting of aluminum, titanium, silicon, zirconium and mixtures thereof coated on the surface of said pigment in amount from 0.25% to 10.00% by weight, and an organic compound of an alpha hydroxy acid having the structure

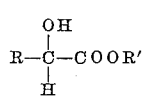

where R is selected from the group consisting of alkyl and aryl radicals and where R' is selected from the group consisting of hydrogen, ammonium, alkali metal, alkyl and aryl radicals, said organic compound being dispersed on the surface of the hydrous oxide coated titanium dioxide pigment in amount from 0.2% to 5.0% by weight of said pigment.

5. An internally pigmented polymeric product according to claim 1 wherein said organic compound of an alpha hydroxy acid is from 0.25% to 2.0% by weight of said pigment and said hydrous oxide coating is from 0.5% to 4.0%.

6. An internally pigmented synthetic film according to claim 2 wherein said organic compound of an alpha hydroxy acid is from 0.25% to 2.0% by weight of said pigment and said hydrous oxide coating is from 0.5% to 4.0%.

7. A method for the preparation of an organic solvent dispersible pigment according to claim 3 wherein said organic compound of an alpha hydroxy acid is from 0.25% to 2.0% by weight of said pigment and said hydrous oxide coating is from 0.5% to 4.0%.

8. A titanium dioxide pigment according to claim 4 wherein said organic compound of an alpha hydroxy acid is from 0.25% to 2.0% by weight of said pigment and said hydrous oxide coating is from 0.5% to 4.0%.

9. An internally pigmented polymeric product according to claim 5 wherein said organic compound of an alpha hydroxy acid is lactic acid.

10. A method for the preparation of an organic solvent dispersible pigment according to claim 7 wherein said organic compound of an alpha hydroxy acid is lactic acid.

11. A titanium dioxide pigment according to claim 4 wherein said organic compound of an alpha hydroxy acid is lactic acid and said hydrous oxide coating comprises substantially 4.0% by weight of said pigment of a mixture of the oxides of aluminum, titanium and silicon.

References Cited in the file of this patent

UNITED STATES PATENTS

| | | |
|---|---|---|
| 2,233,358 | Nutting | Feb. 25, 1941 |
| 2,297,523 | Allan et al. | Sept. 29, 1942 |
| 2,348,672 | Collings et al. | May 9, 1944 |